United States Patent Office 3,453,866
Patented July 8, 1969

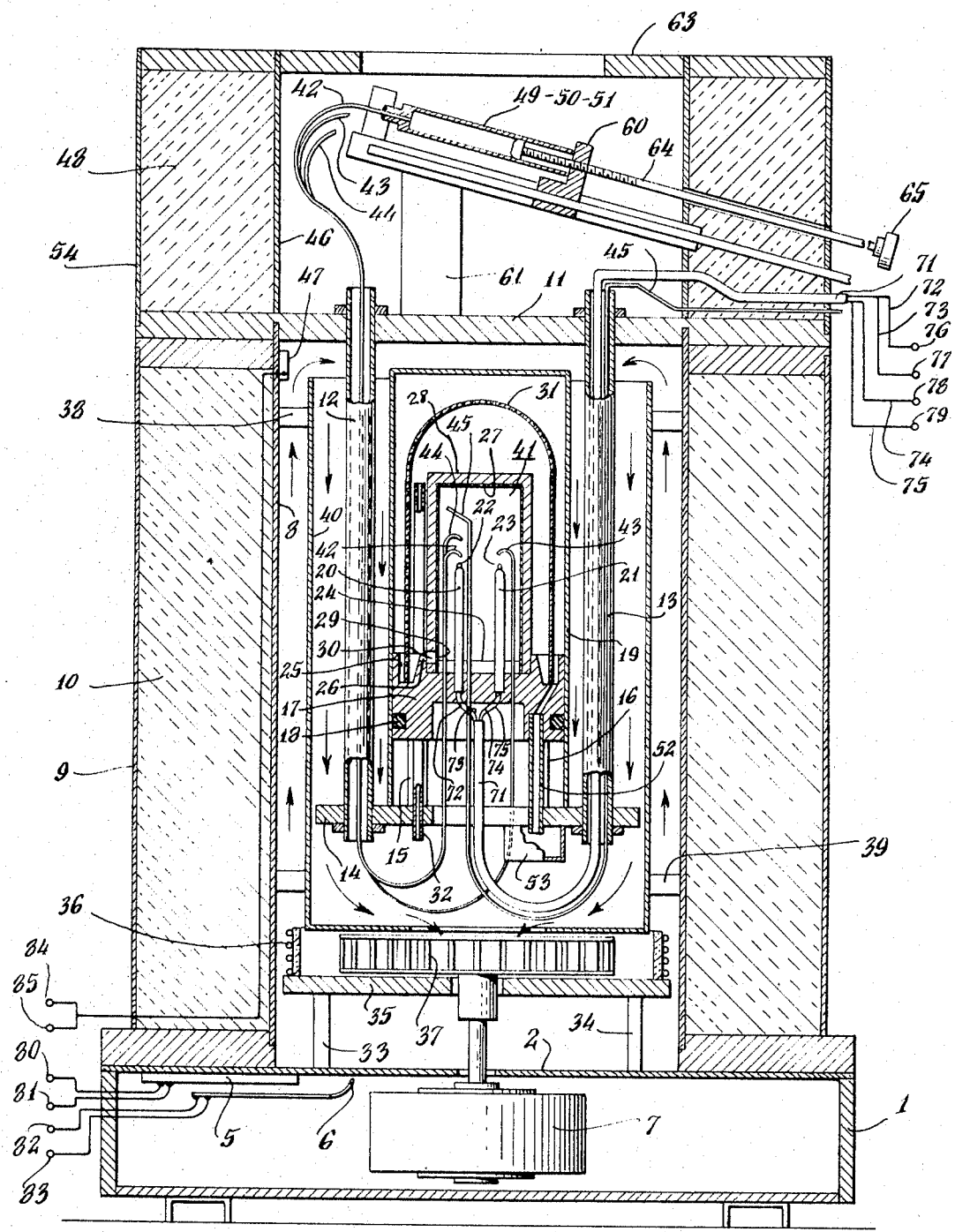

3,453,866
INSTRUMENT FOR MOLECULAR WEIGHT
DETERMINATION
Wilhelm Simon, Zurich, Switzerland, assignor to The Perkin-Elmer Corporation, Norwalk, Conn., a corporation of New York
Filed Feb. 28, 1966, Ser. No. 538,446
Claims priority, application Japan, Apr. 1, 1965, 40/18,643
Int. Cl. G01n 25/00
U.S. Cl. 73—15  9 Claims

ABSTRACT OF THE DISCLOSURE

An isopiestic molecular weight instrument includes a vapor tank and means for establishing a solvent saturated atmosphere within the tank. Temperature measuring elements are positioned upright and the sample is deposited from a position above the elements.

---

This invention relates to instruments for determining the molecular weight of a substance. The invention relates more particularly to an improved form of isopiestic instrument for determining molecular weight.

An isopiestic arrangement is known for determining molecular weight whereby a temperature variation resulting from a difference in vapor pressure existing between a solvent and a solution is detected. In a form of this instrument, temperature sensitive elements are located in a solvent saturated atmosphere and a solution of a solute and the solvent is deposited on one of the elements. Since a solution has a relatively lower vapor pressure than the solvent, the solvent vapor condenses on the solution and the latent heat of condensation accompanying this phase change causes a temperature variation in the element. This temperature variation is then detected. As is well known, the molecular weight of a substance can then be determined from a knowledge of the quantity of solute and solvent and from the magnitude of temperature change.

The practical application of such an arrangement is rendered difficult, however, unless an accurate means for measuring a relatively small temperature variation is provided. To this end, temperature sensitive thermistors have been utilized and arranged in an electrical circuit, such as a bridge circuit, which is responsive to variations in resistance accompanying relatively small variations in the temperature of the thermistors. The thermistors are generally relatively small beads on which drops of the sample are deposited. A resistance variation accompanying this temperature variation unbalances the bridge circuit and causes an indication of temperature change to be registered by the instrument.

Instruments of this type which have been employed heretofore have utilized thermistors suspended in the saturated atmosphere and having depending detector points or beads. A solvent and a solution are dripped thereon from diagonally above. With this arrangement, droplets are formed at the detecting point portions of the thermistors. The size of these drops vary according to the volume, viscosity values and other characteristics of the solvent and solution. As a result, the wetted area of the detecting points can undesirably vary with each determination being made. For this reason, it is generally difficult to obtain accurately reproducable determinations of molecular weight.

The period of time required for the drops to be thinned out to a desired size can depend on a slight change in the volume dropped and the viscosity or the like of the drops. An operator is thus required to observe the detecting points as the dripping occurs in order to provide some control over the uniformity of the drops. This requirement for visual monitoring introduces the possibility of subjective error. As indicated previously, this form of instrument measures temperature change resulting from a relatively small vapor pressure difference between a solvent and solution. Consequently, it is desirable to provide means for thermally shielding the temperature sensitive elements from external agitation. However, such a requirement is generally contrary to the requirement for visual observation of the thermistors and design requirements of this apparatus must consequently and undesirably be relaxed.

Accordingly, it is an object of the present invention to provide an improved form of isopiestic instrument for determining the molecular weight of a substance.

Another object of the invention is to provide a molecular weight determination instrument utilizing thermistors and which overcomes prior difficulties resulting from variation in droplet sizes.

A further object of the invention is to provide a molecular weight instrument which is adapted for operation without visual observation of the detecting elements.

Still another object of the invention is to provide a molecular weight instrument which is relatively insensitive to outside temperature variations.

In accordance with a preferred embodiment of the present invention, an isopiestic molecular weight instrument includes a vapor tank and means for establishing a solvent saturated atmosphere within a tank. Temperature measuring elements are positioned within the tank, are supported substantially upright and are spaced with relation to solvent and solution injection means in a manner for inhibiting the formation of droplets on the elements. A desired degree of solvent saturated atmosphere is provided by a reservoir and means adapted for maintaining a relatively constant level of solvent therein. Means are also provided, in accordance with a feature of the invention, for establishing a thermal gradient in the saturated atmosphere in a direction corresponding to orientation of the detecting elements to thereby inhibit variations in the vapor pressure at points in the atmosphere which might otherwise arise from thermal agitation.

These and other features of the invention will become apparent with reference to the following specifications and drawing which is a diagrammatic sectional view of an instrument incorporating the invention.

Referring now to the drawing, the molecular weight instrument includes a box like base 1, having a top plate 2 fabricated of a material exhibiting excellent radiation characteristics. The base 1 forms a support for the instrument. Portions of an oven system including an auxiliary electrical heater 5, a temperature sensing thermistor 6 and a fan motor 7 are housed within the base 1. Input terminals 80 and 81 are coupled by lead-in wires to the heater 5 while input terminals 82 and 83 are coupled by lead-in wires to the thermistor 6. The base 1 supports a pair of concentric cylinders 8 and 9 which are separated by a layer of heat insulating material 10. A cover plate 11 is positioned on the insulated cylinders 8 and 9 and a second pair of concentric cylinders 46 and 54 are positioned on the cover plate 11 and are similarly insulated by a heat insulating material 48.

In addition to the heater 5, thermistor 6, and fan 7, the oven portion of the instrument includes a primary heater coil 36 comprising a coil wound and supported on a heat insulating material such as ceramic and supported on a plate 35. The support plate 35 is spaced away from the base plate 2 by spacers 33 and 34. A radiation cylinder 40 is concentrically supported within the heat insulating cylinder 8 by spacers 38 and 39. The cylinder 40 is open at an upper end thereof and has an aperture in a lower end. A fan 37 which is coupled to, and driven by, the motor 7 is disposed between this aperture and the heater support plate 35 and causes circulation of the air within the tank. The arrows indicate generally the flow path which extends past the heating coil and upwardly between the cylinders 8 and 40 and returns through the cylinder 40. A second thermistor 47, in conjunction wtih the thermistor 6 and the heaters 5 and 36 control the temperature of the oven.

A detector assembly of the instrument is suspended from the cover plate 11 by support pipes 12 and 13. These pipes support a base plate 14 on which a thermistor base plate 17 is mounted by legs 15 and 16. A radiation cylinder 19 surrounds the outer periphery of the thermistor base 17 and is sealed by packing 18. A temperature sensing thermistor 20 and a temperature sensing thermistor 21 are positioned upright on the thermistor base 17. The upper ends of these elements constitute the thermistor detecting portions 22 and 23 respectively. A liquid reservoir 24 and a groove 25 for receiving a paper filter cylinder 31 are located on the thermistor base plate 17. The groove 25 annularly surrounds the reservoir 24. An overflow section 26 is provided on thermistor base plate 17 between the reservoir 24 and the groove 25. This overflow section may be either a channel or a simple hole. A paper filter cylinder 27 and a radiation cylinder 28 are concentrically positioned and in contact with each other and are located in the reservoir 24. As shown in the drawing, the radiation cylinder 28 is disposed about the outer surface of the paper filter cylinder 27. Holes 29 and 30 are provided on the sides of both the paper filter cylinder 27 and the radiation cylinder 28. An air pipe 32 extends through the thermistor base 17 and is located between the paper filter cylinder 31 and the radiation cylinder 28.

A vapor tank, indicated generally as 41, is defined by the paper filter cylinder 27 and the thermistor base plate 17. This chamber communicates with the air in the oven through holes 29 and 30 and through the air pipe 32. Three drip tubes 42, 43, and 44 and a jet tube 45 extends through the thermistor base plate 17. Mouths of the drip tubes 42 and 43 face the detector portions 22 and 23 of the temperature measuring thermistors 20 and 21 respectively while a jet nozzle mouth of the tube 45 is positioned opposite the inner wall of the paper filter cylinder 27. A mouth of the drip tube 44 also faces the detector point 22 of the thermistor 20. The other ends of the drip tubes 42, 43 and 44 and the jet tube 45 extend through pipes 12 and 13 to the sample chamber which is positioned on the cover plate 11. The three drip tubes leading from the vapor chamber 41, for the purposes of the illustration, are ganged and indicated as a single tube extending up through the pipe 12 into the sample chamber. The jet tube 45 is shown to extend through the pipe 13 of the sample chamber. A pair of electrical leads 72 and 73 extend from the thermistor 20 and a pair of electrical leads 74 and 75 extend from the thermistor 21. These leads are formed into a cable 71 which extends through the pipe 13 into the sample chamber and thence through the cylinder 46 and 54 to terminals 76, 77, 78 and 79 respectively. The thermistors 20 and 21, as indicated previously, are arranged in a bridge type circuit and small variations in their resistance attending temperature changes of their detector portions will be indicated by the bridge circuit in a known manner.

Three micrometer syringes, 49, 50 and 51, are positioned in the sample chamber and are supported by a syringe mount 60. The syringe mount 60 is supported in a slanting position by a support 61 in order to eliminate air from entering the sample tubes. In the sectional view of FIGURE 1 only a single syringe 49 is indicated. It will be understood that the syringes 50 and 51 are mounted side by side with syringe 49. Each of the syringes 49, 50 and 51 is coupled to an associated tube 42, 43 and 44 respectively. These syringes are adapted for removal and insertion through an aperture in cover plate 63. A threaded mechanical coupling rod 64 having a knob 65 positioned on an outer portion of the tank may be screwed in a syringe when a syringe is properly located in the mount 60. By rotating the coupling in a clockwise position for example, a plunger within the syringe can be forced forward and a calibrated amount of solvent or solution is injected into the tubing and forced from a mouth of an associated drip tube. The tubing for the spray nozzle 45 extends through the cylinders 46 and 54 and is connected to a reservoir of solvent, not illustrated, for spraying the paper filter cylinder 27. Alternatively, a reservoir of solvent for the tube may be positioned in the sample chamber.

In operation, the motor 7, main heater 36 and auxiliary heater 5 are actuated simultaneously by a switch. The heat generated by the main heater 36 is conducted by the fan 37, as indicated previously, principally from between the space between the heat shielding cylinder 40 and the radiation cylinder 19. The heat developed by the auxiliary heater is at a lower temperature than that produced by the main heater 36 and accordingly part of the heat thus produced is conducted along the upper plate 2 of the base 1 and is arrested below this plate, thereby causing a convection. The heat which is conducted between the heat shielding cylinder 40 and the radiation cylinder 19 is dissipated through this radiation cylinder and further dispersed by radiation cylinder 28 through the cylinder 31. The heat so radiated is then transmitted to the vapor tank 41 through the paper filter cylinder 27. The heated temperature caused by the main heater 36 and the auxiliary heater 5 are detected respectively by the thermistors 47 and 6, and the temperature inside the vapor tank 41 is thereby controlled to any desired value. The heat generated by the main heater 36 is conducted downwardly between the cylinder 40 and the radiation cylinder 19 while radiating part of the heat, equivalent to a constant quantity of heat, downwardly with the aid of heater 5. This causes a temperature gradient to be produced inside the vapor tank 41. The temperature inside the vapor tank is higher at the upper portion of the tank and correspondingly lower at lower portions of the tank.

Operation of the micrometer syringes 49, 50 and 51 will cause a dripping of the solvent and solution from the openings of the drip pipes 42, 43 and 44 respectively. The solvent is first dripped from the mouths of the drip pipes 42 and 43 onto the detecting points 22 and 23 while the solvent is also allowed to gush out over the inner wall of the paper filter cylinder 27 from the jet pipe 45. The solvent is then collected in the reservoir 24 and premeates the paper filter cylinder 27. An overflow of solvent from the reservoir 24 flows through the holes 29 and 30 and beyond the overflow section 26 into the groove 25 which supports the paper filter cylinder 31. This overflow solvent permeates the paper filter cylinder 31 as well and any excess is led through a liquid drain pipe 52 until it is drained into a receptacle 53. Thus, the solvent is maintained at a relatively constant level within the reservoir 24.

As the vapor tank 41 is heated to a desired temperature, it is filled with saturated vapor of the solvent and the output signals from the temperature measuring thermistors 20 and 21 become stable. In other words, zero correction is accomplished. The solution is then dripped from the mouth of the drip pipe 44 onto the detecting point 22 by actuation of the syringe 51. Since the vapor pressure of a solution is lower than that of a solvent vapor, the vapor of the solvent condenses on the surface of the detecting portion 22. This condensation is accomplished by an elevation of the temperature $\Delta T$ of the solution resulting from the latent heat released during the condensation. The solution temperature continues to rise until the vapor pressures of the solvent and solution attain an equilibrium. Since the variation in the temperature $\Delta T$ is related to the molecular weight of the solute and solvent, the molecular weight can therefore be determined.

In accordance with a feature of the invention, the thermistors 20 and 21 are supported in a manner for providing that the detecting portions 22 and 23 are opposite the drip ports and hence are constantly moistened over certain predetermined areas regardless of minor errors or variations in the amount, viscosity and other characteristics of the liquid dripped thereon. This arrangement substantially inhibits the formation of drops on the detecting portions, as previously indicated.

In order to establish the desired saturated atmosphere within the vapor tank 41, a reservoir 24 is generally required. If the solvent level in the reservoir varies by rising or lowering, the degree of saturation in the proximity of the detecting points 22 and 23 inside the tank will be varied accordingly, thereby rendering it difficult to obtain reproducable determination values. This difficulty is eliminated in accordance with another feature of the present invention by the overflow means 26 which is provided to maintain a constant level at all times.

Although the degree of saturation within the tank 41 is such that the saturation near the liquid level in the reservoir 24 is substantially 100%, the degree of saturation will gradually decrease in the upper portion of the tank. Thus, it may be considered that vapor layers are distributed within the tank 41 in such a manner that the degree of saturation is greater in the upper section and smaller in the lower section of the tank. If the temperature in the upper section of the tank is low and that in the lower section is relatively higher in the presence of such vapor layers, a convection will cause different degrees of saturation for the detector points 22 and 23 and prevent the latter from providing reproducable determinations. According to another feature of the invention, a temperature gradient is established inside the tank 41 and the temperature is established at a higher value in the upper section of the tank and a relatively lower value in the lower section of the tank thereby substantially precluding the convection problem.

The attainment of the desired degree of saturation is enhanced by the utilization of the paper filter cylinders 27 and 31 and the radiation cylinders 28 and 19. Thus, the vapor tank 41 is surrounded and enclosed with multiple layers provided by the paper filter cylinders 27 and 31 and the radiation cylinders 19 and 28. The effect of external temperatures is thereby greatly reduced.

Thus, there has been described an improved form of an instrument for determining molecular weight wherein the disadvantages attending downwardly disposed detector points is avoided while the degree of saturation in the vicinity of the detector points is maintained relatively constant. In addition, the degree of saturation at the detector points is further stabilized by a temperature gradient provided by establishing a relatively higher temperature in an upper section of the vapor tank and a relatively lower temperature in a lower section of the vapor tank.

While I have illustrated and described a particular embodiment of my invention, it will be understood that various modifications may be made therein without departing from the spirit of the invention or the scope of the appended claims.

I claim:

1. An instrument for the determination of molecular weight comprising:
   a vapor tank,
   means for establishing a solvent saturated atmosphere within said vapor tank,
   first and second elongated temperature measuring thermistors each having a detector portion at one end thereof,
   means supporting each of said thermistors in said tank and positioning said detector portions at a relatively higher elevation in said atmosphere with respect to other portions of the same thermistor,
   injection means for depositing a solution and a solvent on said first thermistor detector portion and a solvent on said second thermistor detector portion, and
   circuit means coupled to the thermistors for detecting a variation in resistance thereof.

2. The instrument of claim 1 including heating means for establishing a temperature gradient of decreasing temperature extending in a direction from an upper to a lower portion of the tank.

3. The instrument of claim 2 wherein said thermistors are supported in a substantially vertical position and said injection means are arranged for dripping the solvent on said detector portions and for dripping the solution on said first thermistor detector portion.

4. The instrument of claim 3 wherein said thermistors are supported by a thermistor base plate and said injection means include grip pipes having mouths thereof positioned opposite and above the detector portions of the measuring thermistors.

5. An instrument for the determination of molecular weight comprising:
   first and second elongated temperature measuring thermistors each having a detector portion at an end thereof,
   a thermistor base plate for supporting said thermistors vertically and positioning the detector portions uppermost with respect to other portions of said thermistors,
   injection means including drip pipes having mouths positioned opposite the detector portions of the measuring thermistors,
   said injection means adapted for injecting a solvent and a solution into the drip pipes and for causing the solvent to drip on said first and second detector portions and the solution to drip on said first detector portion,
   a fluid reservoir located on said thermistor base plate,
   means, including an absorbent means communicating with said reservoir, and forming with said base plate a vapor tank which encloses said thermistor detector portions and said drip pipes,
   circuit means coupled to said thermistors for detecting a variation in resistance thereof, and,
   means for establishing a temperature gradient of decreasing temperature extending in a direction from an upper to a lower portion of the tank.

6. The instrument of claim 5 including means for establishing a maximum fluid level in said reservoir.

7. An instrument for the determination of molecular weight comprising:
   first and second elongated temperature measuring thermistors each having a detector portion located at an end thereof,
   a thermistor base plate for supporting said thermistors vertically and positioning the detector portions uppermost with respect to other portions of said thermistors,
   fluid injection means including drip pipes having mouths positioned opposite the detector portions of the measuring thermistors,
   said injection means adapted for injecting a solvent and solution into the drip pipes and for causing the solvent to drip on the detector portions of said first and second thermistors and the solution to drip on the detector portion of said first thermistor,
   a solvent reservoir positioned on said thermistor base plate,
   an overflow channel disposed about said reservoir,
   means for forming with said base plates a vapor chamber enclosing said thermistor detector portions and said drip pipes;
   said latter means including a first solvent absorbent material positioned in said reservoir,
   means including an aperture in said absorbent material for providing fluid communication between said reservoir and said overflow channel and for establishing an upper level for said reservoir,
   a second solvent absorbent material positioned in said channel and enclosing said vapor chamber,
   heating means for establishing a temperature gradient in a vertical direction in said vapor chamber, and circuit means for detecting a variation in resistance of said thermistors.

8. In a molecular weight determination instrument of the type having a vapor tank, first and second temperature measuring thermistors positioned within said tank, means supporting each of said thermistors in said tank and positioning the detector portions at a relatively higher elevation in the atmosphere with respect to other portions of the same thermistor, means including a reservoir of solute for providing a saturated atmosphere of solvent vapor within said tank, means for depositing a solution and a solvent on the first thermistor and a solvent on the second thermistor, and means for detecting variations in the resistance of the thermistors, a means for maintaining the atmosphere at a desired degree of saturation including an overflow means for limiting the level of solvent in said reservoir.

9. In a molecular weight determination instrument of the type having a vapor tank, means including a fluid reservoir for providing a saturated atmosphere of solvent within said tank temperature detecting elements positioned adjacent and spaced from said reservoir in a first direction means for depositing a fluid on said elements, and means for detecting variations in the resistance of the thermistors, a heating means adapted for establishing a thermal gradient in said tank, said gradient extending in said first direction.

References Cited

UNITED STATES PATENTS

| | | | |
|---|---|---|---|
| 2,979,950 | 4/1961 | Leone | 73—17 |
| 3,282,082 | 11/1966 | Fagioli et al. | 73—15 |
| 3,293,905 | 12/1966 | Ratway et al. | 73—36 |

FOREIGN PATENTS 654,805   12/1962   Canada.

JAMES J. GILL, *Primary Examiner.*

H. GOLDSTEIN, *Assistant Examiner.*

U.S. Cl. X.R.

73—53